(12) United States Patent
Fulton et al.

(10) Patent No.: US 7,752,511 B2
(45) Date of Patent: Jul. 6, 2010

(54) DEVICES, SYSTEMS, AND METHODS REGARDING A PLC SYSTEM FAULT

(75) Inventors: Temple L. Fulton, Elizabethton, TN (US); Lothar Trapp, Feucht (DE); Heiner Fuchs, Erlangen (DE)

(73) Assignee: Siemens Industry, Inc., Alpharetta, GA (US)

( * ) Notice: Subject to any disclaimer, the term of this patent is extended or adjusted under 35 U.S.C. 154(b) by 332 days.

(21) Appl. No.: 11/890,894

(22) Filed: Aug. 8, 2007

(65) Prior Publication Data

US 2008/0126882 A1 May 29, 2008

Related U.S. Application Data

(60) Provisional application No. 60/836,235, filed on Aug. 8, 2006.

(51) Int. Cl.
*G01R 31/28* (2006.01)
(52) U.S. Cl. ...................................................... 714/725
(58) Field of Classification Search ................... 714/725
See application file for complete search history.

(56) References Cited

U.S. PATENT DOCUMENTS

| | | | |
|---|---|---|---|
| 3,953,834 A | 4/1976 | Burkett | |
| 3,982,230 A | 9/1976 | Burkett | |
| 3,997,879 A | 12/1976 | Markley | |
| 5,097,470 A * | 3/1992 | Gihl | 714/55 |
| 6,701,480 B1 * | 3/2004 | Karpuszka et al. | 714/764 |
| 6,711,698 B1 * | 3/2004 | Marbach et al. | 714/4 |
| 6,745,254 B2 | 6/2004 | Boggs | |
| 6,904,471 B2 | 6/2005 | Boggs | |
| 7,000,191 B2 * | 2/2006 | Schmitt et al. | 715/764 |
| 7,124,206 B2 * | 10/2006 | Hausman | 709/250 |
| 7,607,070 B2 * | 10/2009 | Clark et al. | 714/776 |
| 2003/0200022 A1 | 10/2003 | Streichsbier | |
| 2005/0080527 A1 | 4/2005 | Tao | |
| 2006/0052958 A1 * | 3/2006 | Hancock et al. | 702/60 |

\* cited by examiner

*Primary Examiner*—James C Kerveros
(74) *Attorney, Agent, or Firm*—Jose de la Rosa

(57) ABSTRACT

A method for providing a signal indicative of a set single bit flag, which is set for a scan cycle responsive to a detection of a fault in an Input/Output (I/O) device of a programmable logic controller (PLC) system or an I/O interface of the PLC system. Numerous other aspects are provided.

19 Claims, 3 Drawing Sheets

3000

DEVICES, SYSTEMS, AND METHODS REGARDING A PLC SYSTEM FAULT

CROSS-REFERENCES TO RELATED APPLICATIONS

This application claims priority to, and incorporates by reference herein in its entirety, pending U.S. Provisional Patent Application Ser. No. 60/836,235, filed 8 Aug. 2006.

BACKGROUND

Programmable logic controllers can be used for monitoring parameters and/or controlling devices. One or more sensors can be communicatively coupled to a programmable logic controller (PLC) via one or more input/output (I/O) modules. Via an I/O module, the PLC can control one or more devices, such as a rheostat, switch, sequencer, stepper motor controller, servo controller, actuator controller, stepper drive, servo drive, stepper motor, servomotor, linear motor, motor, ball screw, servo valve, hydraulic actuator, and/or pneumatic valve, etc. The PLC can be susceptible to faults resulting from equipment failure and/or data transmission errors (e.g., an I/O channel error).

SUMMARY

Certain exemplary embodiments can comprise a method, which can comprise providing a signal indicative of a set single bit flag. The flag can be set for a scan cycle responsive to a detection of a fault in an Input/Output (I/O) device of a PLC system or an I/O interface of the PLC system.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a method, which can comprise providing a signal indicative of a set single bit flag. The flag can be set for a scan cycle responsive to a detection of a fault in an Input/Output (I/O) device of a PLC system or an I/O interface of the PLC system.

Certain exemplary embodiments can provide a fault indication flag that can be made available to a user of the PLC. The fault indication flag can be a single bit adapted to provide a system-wide indication of fault-free performance of a central processing unit (CPU) of the PLC, one or more modules communicatively coupled to the PLC, an annex card comprised by the PLC, annex modules communicatively coupled to the PLC, and/or a memory card (MMC) associated with the PLC, etc. If any one of a predetermined set of such devices indicates a diagnostic problem, which can comprise an invalid quality indication, the CPU can set the fault indication flag to a value indicative of a fault. As long as there are no detected problems, the CPU can set the fault indication flag to a value not indicative of the fault.

In certain exemplary embodiments, the user can use the fault indication flag to invoke a system function that can be adapted to return a count of diagnostics and/or details of each detected diagnostic problem.

To avoid repeated error processing for a persistent diagnostic problem, certain exemplary embodiments can detect a first occurrence of a diagnostic event and can set the fault indication flag for a single scan cycle. As long as the diagnostic event persists and no new diagnostic events occur, the CPU of the PLC can reset the fault indication flag on subsequent scan cycles.

In certain exemplary embodiments, when the diagnostic event that set the fault indication flag goes away, the fault indication flag can be set for a single scan cycle as an indication of a change in the diagnostic status. If a diagnostic event is the only diagnostic event present in the system and the diagnostic event goes away, a call can be made to a system function that returns a count of diagnostics, an indication that no diagnostics are currently present in the system, and/or an indication that the diagnostic event went away.

In certain exemplary embodiments, the fault indication flag can be set to a value of zero when there are no I/O errors and can be set to a value of one when at least one I/O error is present. Firmware of the CPU can be adapted to establish the value of the fault indication flag during each scan cycle based on quality information (e.g., checksum values) reported from an input/output (I/O) subsystem. In certain exemplary embodiments, a fault indication flag can be created for each partial process image defined in a project of the user. Certain exemplary embodiments can make a determination regarding setting the fault indication flag before calling a predetermined routine associated with operation of the PLC.

Figure 1:
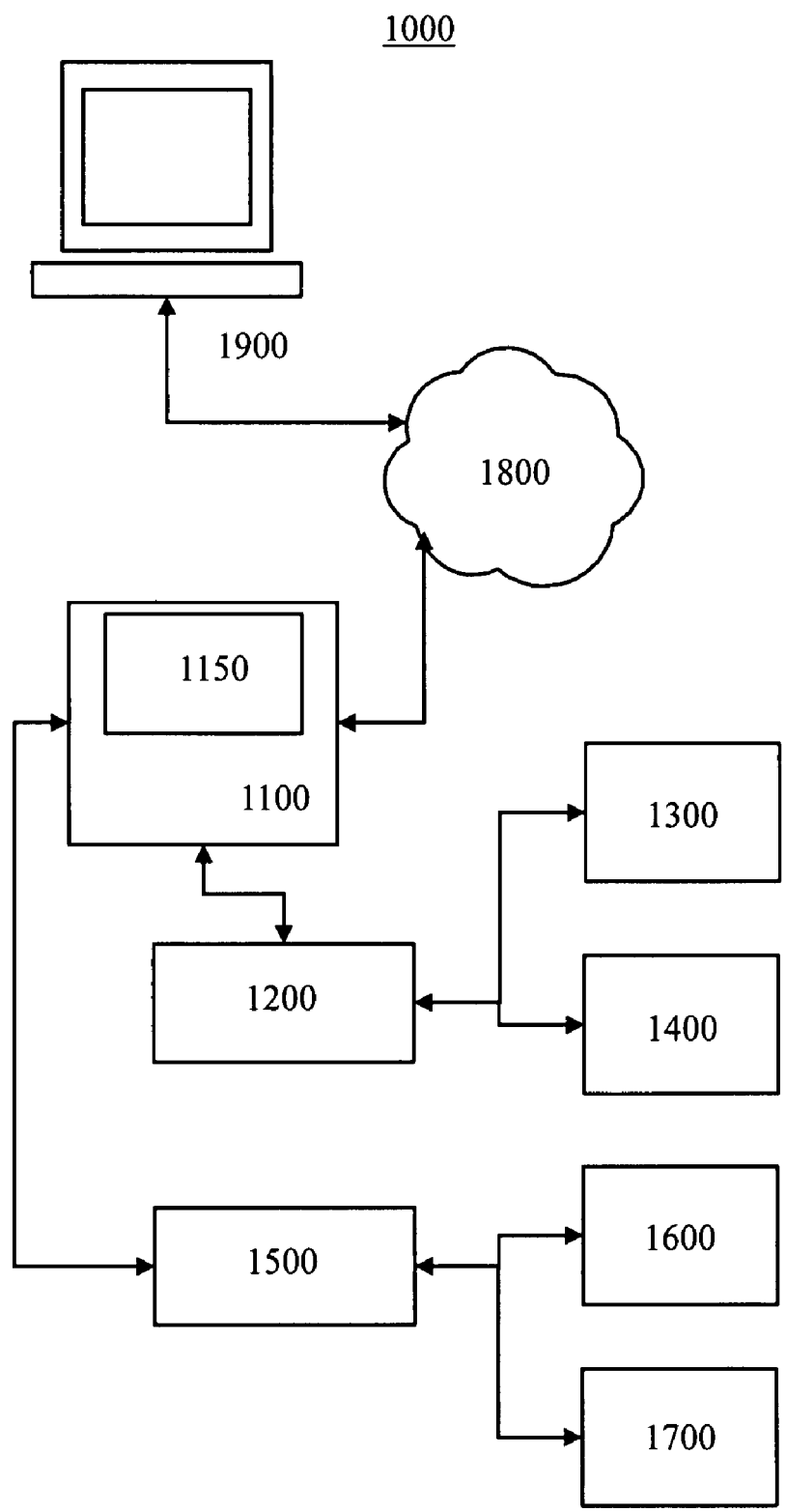
FIG. 1 is a block diagram of an exemplary embodiment of a system 1000.

FIG. 1 is a block diagram of an exemplary embodiment of a system 1000, which can comprise a PLC 1100, which can be communicatively coupled to an information device 1900 via a network 1800. PLC 1100 can be communicatively coupled to a first module 1200 and/or a second module 1500. First module 1200 and second module 1500 can be typical of modules communicatively coupled to PLC 1100. In certain exemplary embodiments, PLC 1100 can be communicatively coupled to a single module or any size set of modules such as, for example, 1, 2, 3, 4, 5, 6, 7, 10, 15, 18, 20, 95, 109, 150, and/or any value or subrange therebetween.

First module 1200 and/or second module 1500 can be selected from a group comprising an I/O module, annex module, expansion module, digital I/O module, analog I/O module, annex card, memory card, and/or Ethernet module, etc. First module 1200 can be communicatively coupled to one or more sensors, such as sensor 1300 and/or one or more actuators, such as actuator 1400. Second module 1500 can be communicatively coupled to one or more sensors, such as sensor 1600 and/or one or more actuators, such as actuator 1700.

PLC 1100 can comprise and/or be communicatively coupled to a circuit 1150. Circuit 1150 can be a circuit adapted to provide a signal indicative of a set single bit flag. The single bit flag can be set for a first scan cycle responsive to a detection of a fault in an Input/Output (I/O) device such as a sensor 1300, sensor 1600, actuator 1400, and/or actuator 1600. The single bit flag can be set for a single first scan cycle responsive to a detection of a fault in an I/O interface such as a first module 1200 and/or a second module 1500. The flag can be promptly reset at a conclusion of the first scan cycle. Responsive to a determination that the fault has been cleared, the flag can be set for a second scan cycle. The flag can be promptly reset at a conclusion of the second scan cycle.

Figure 2:
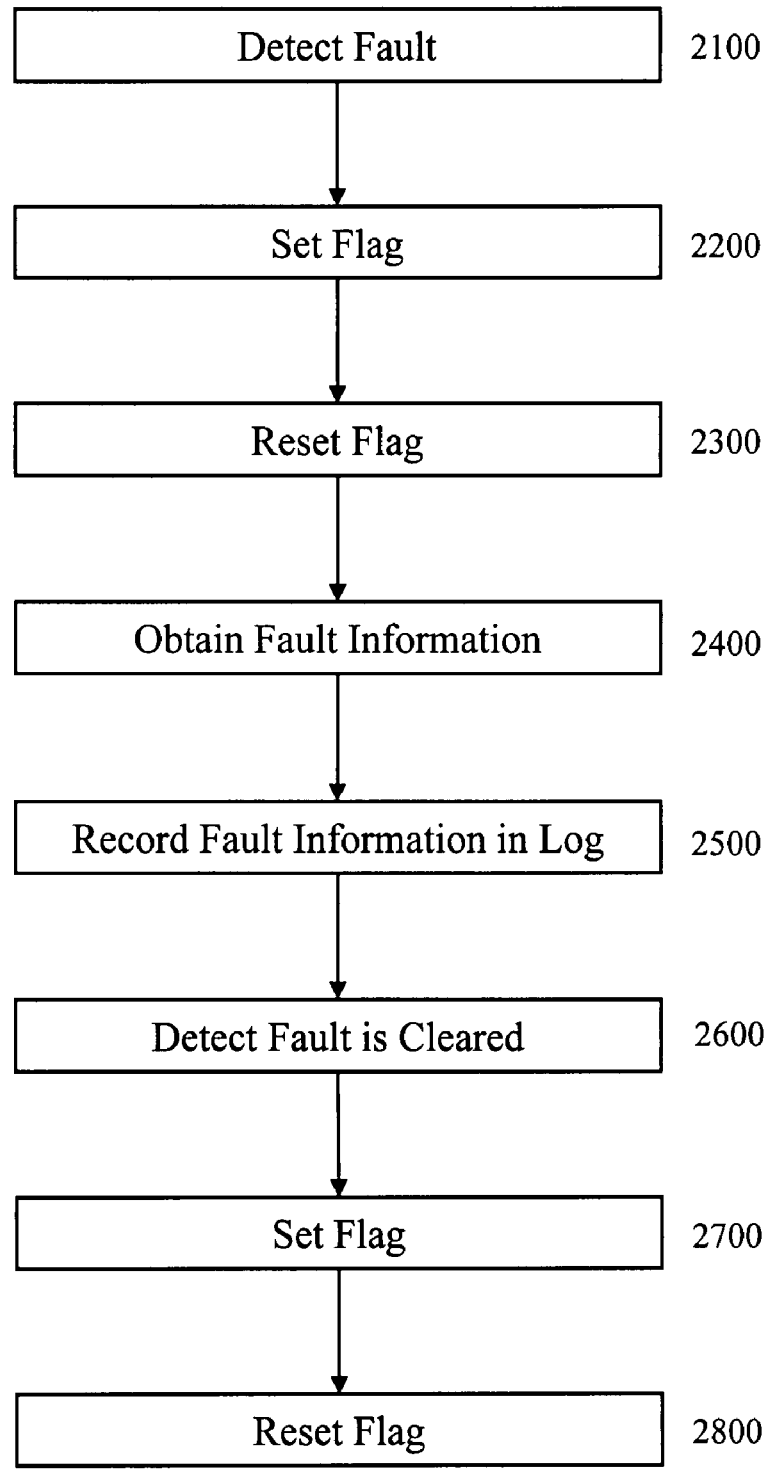
FIG. 2 is a flowchart of an exemplary embodiment of a method 2000.

FIG. 2 is a flowchart of an exemplary embodiment of a method 2000. At activity 2100, a fault and/or change in status of a fault can be detected in a PLC system. The fault and/or change in status of the fault can be in a signal from an Input/Output (I/O) device or I/O interface of the PLC system. The fault and/or change in status of the fault can be detected via a cyclical redundancy check (CRC) in a signal and/or via other information. The fault can be detected via a CRC check by the I/O device, and/or firmware thereof. The CRC check can be analyze a message transmitted from the I/O device and/or a message transmitted to the I/O interface. Integrity of the message can be checked using a CRC. In certain exemplary embodiments, a module can implement a checksum or CRC check to verify that firmware and/or static data memory systems are properly functioning. In certain modules a current can be transmitted through a sensor and/or actuator as a means of detecting the fault based upon an open circuit condition. Those skilled in the art will recognize other possibilities that can be used to detect faults. A diagnostic type and/or a diagnostic source can be associated with the fault. The fault or change in fault status can be detected by the I/O device and reported via a message sent to a PLC over a backplane of the PLC system.

At activity 2200, a single bit flag can be set responsive to the fault detected in the PLC system. The single bit flag and/or a signal indicative of the flag can be automatically made available to, provided to, and/or received by a user control program of the PLC of the PLC system. The user control program can be written in an International Electrotechnical Commission (IEC) standard 1131-3 compliant language. The user program can be adapted to, via a rule based action, respond to the signal indicative of the flag. The user control program can be adapted to automatically determine a history of status changes of the flag.

The user control program can analyze a signal indicative of the flag. The user control program can analyze a cause of a change in status of the flag and/or respond via one or more predetermined actions. The user control program can examine a nature of each detected fault based upon a set of fault rules, such as user created rules. For certain predetermined faults, PLC firmware can be adapted to create and/or trigger an event and/or make the flag available to the user program. The event can cause one or more of an execution of a user interrupt, an execution of a system interrupt, an invocation of a user PLC program, an expiration of a watchdog timer, an execution of an object block (OB), an execution of a second OB that stops an execution of a previously executing first OB, creation of a diagnostic error, and/or a diagnostic error. In certain exemplary embodiments, the second OB can preempt execution of the first OB and, when the second OB completes execution, the first OB can resume. The user control program and/or a user of the PLC can determine the status and/or history of status changes of the single bit flag via a call to a system function and/or scanning the log.

At activity 2300, the single bit flag can be reset promptly after a single scan cycle. In order to avoid redundant analyses of the fault by the user control program, the single bit flag might remain set, responsive to the fault, for only a single predetermined time interval called a "scan cycle". The scan cycle can be less than approximately one second in duration. After the single scan cycle, if another status change is not detected (e.g., the fault has not cleared), the PLC can be adapted to reset the flag until the fault is cleared or another status change in any Input/Output (I/O) device or I/O interface of the PLC system is detected.

At activity 2400, information regarding the fault can be obtained, such as via a message indicative of the fault. The information can comprise a date and/or a time at which the fault was detected. The information can comprise a categorization and/or an identification of the fault. The PLC can analyze the message from the module and record the change in device status in a diagnostic source object.

At activity 2500, the information regarding the fault can be recorded, such as in an entry in a log. For example, the PLC can log the diagnostic source object in a log, such as a log object. The log can comprise an entry and/or timestamp for each diagnostic condition reported, which can comprise details about the diagnostic and might not be restricted to a status of a single bit.

At activity 2600, the determination can be made that the detected fault has been cleared. The fault can be cleared manually and/or automatically. The determination can be made via a CRC check and/or an analysis of a signal associated with the PLC system.

At activity 2700, the single bit flag can be set responsive to the cleared fault. The single bit flag can be set for a single scan cycle and can be indicative of a change in status of the fault. Information regarding the cleared fault can be obtained and/or stored in the log. For example, a date and time at which the fault was cleared can be stored in the log.

At activity 2800, the single bit flag can be reset promptly after a single scan cycle. Resetting the flag after a single scan cycle can result in a call to an error handling function only once for each occurrence of an error and once for each time the error is cleared. The flag can provide a utility equivalent to a generation of an interrupt caused by an error condition without complexity associated with interrupt handling in the user control program.

Figure 3:
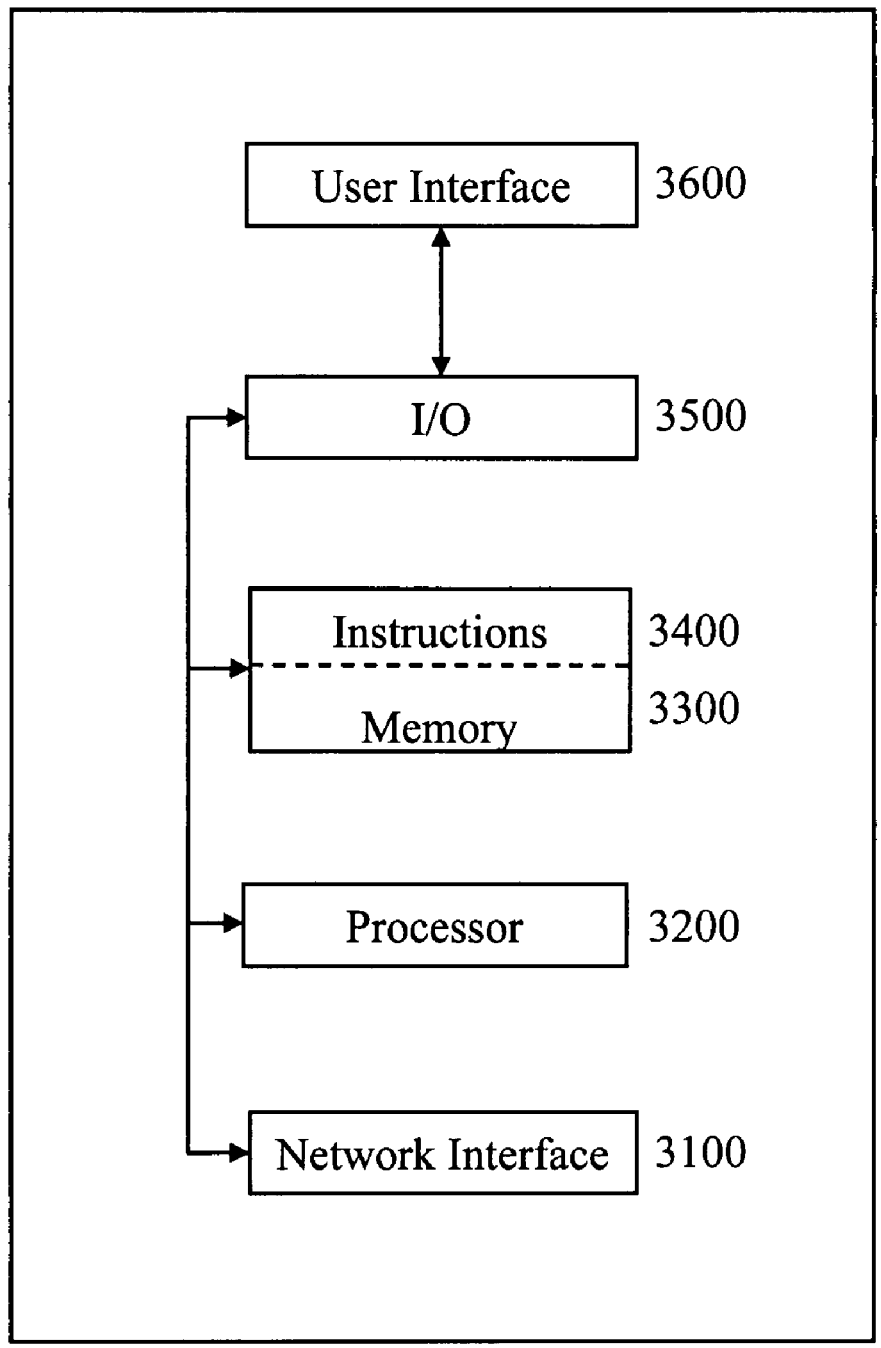
FIG. 3 is a block diagram of an exemplary embodiment of an information device 3000.

FIG. 3 is a block diagram of an exemplary embodiment of an information device 3000, which in certain operative embodiments can comprise, for example, information device 1900 of FIG. 1. Information device 3000 can comprise any of numerous components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

action—(n) a deed, act, activity, performance of a deed, act, and/or activity, and/or something done and/or accomplished. (v) to perform a deed, act, and/or activity.

activity—an action, act, deed, function, step, and/or process and/or a portion thereof.

actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).

adapted to—suitable, fit, and/or capable of performing a specified function.

adjacent—in close proximity to, near, next to, and/or adjoining.

after—subsequent in time.

always—on every occasion.

analyze—to review, study, examine, evaluate, and/or consider in detail and/or to subject to an analysis in order to discover essential features and/or meaning.

and/or—either in conjunction with or in alternative to.

apparatus—an appliance or device for a particular purpose.

approximately—about and/or nearly the same as.

associated with—related to.

at least—not less than.

automatically—acting and/or operating in a manner essentially independent of external human influence and/or control. For example, an automatic light switch can turn on upon "seeing" a person in its view, without the person manually operating the light switch.

based upon—determined in consideration of and/or derived from.

below—beneath; in a lower place; and/or less than.

bit—an information unit that always has a value of either zero or one.

can—is capable of, in at least some embodiments.

capable—a potential for use.

cause—to bring about, provoke, precipitate, produce, elicit, be the reason for, result in, and/or effect.

change—(v) to cause to be different; (n) the act, process, and/or result of altering or modifying.

circuit—an electrically conductive pathway comprising one or more operative electrical devices.

clear—made to go away.

component—a constituent element and/or part.

comprised by—included by.

comprise—to include but not be limited to.

conclusion—end.

control program—software for controlling a machine or group of machines to perform a defined task.

create—to make, form, produce, generate, bring into being, and/or cause to exist.

cyclic redundancy check (CRC)—a type of function used to produce a checksum, which is a small number of bits, from a large block of data such as a packet of network traffic or a block of a computer file, in order to detect errors in transmission and/or storage. A CRC is computed and appended before transmission or storage, and verified afterwards to confirm that no changes occurred.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

deadline—a time interval during which an activity's completion has more utility to a system, and after which the activity's completion has less utility. Such a time interval might be constrained only by an upper-bound, or it might be constrained by both upper and lower bounds.

define—to establish the meaning, relationship, outline, form, and/or structure of; and/or to precisely and/or distinctly describe and/or specify.

detect—to sense, perceive, identify, discover, ascertain, respond to, and/or receive the existence, presence, and/or fact of.

determine—to obtain, calculate, decide, deduce, establish, and/or ascertain.

device—a machine, manufacture, and/or collection thereof.

diagnostic error—a malfunction in a PLC system.

each—every one of a group considered individually.

entry—an element of an array.

execute—to carry out a computer program and/or one or more instructions.

event—an occurrence that causes a predetermined response from a PLC.

fault—an undesired and/or dysfunctional system state and/or an imperfection, defect, error, and/or discrepancy.

firmware—a set of machine-readable instructions that are stored in a non-volatile read-only memory, such as a PROM, EPROM, and/or EEPROM.

first—an initial element of a series.

flag—an informational status indicator.

for—with a purpose of.

from—used to indicate a source.

further—in addition.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to a system (or sub-system) having activities with hard deadlines, and a sequencing goal of always meeting all those hard deadlines. A system operating in hard real-time can suffer a critical failure if time constraints are violated. A classic example of a hard real-time computing system is an automobile engine electronic valve timing control system, in which an overly delayed or overly advanced control signal might cause engine failure or damage, due to one or more valve-piston collisions. Systems operating in hard real-time typically utilize instructions embedded in hardware and/or firmware.

have—to be identified by.

history—a record of temporal events.

indicative—serving to indicate.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

input—a signal, data, and/or information provided to a processor, device, and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

interface—(n) a boundary across which two independent systems meet and act on and/or communicate with each other. (v) to connect with and/or interact with by way of an interface.

International Electrotechnical Commission (IEC)—an international standards and conformity assessment body that prepares and publishes International Standards for electrical, electronic, and related technologies.

International Electrotechnical Commission (IEC) standard 1131-3 compliant language—a PLC programming language that meets the requirements of IEC standard 1131-3.

interrupt—a machine instruction adapted to cause a computer program and/or sub-program to cease execution.

log—a record of events.

machine instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable—of a form from which an information device can obtain data and/or information.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

measure—(n) a quantity ascertained by comparison with a standard. (v) to physically sense, and/or determine a value and/or quantity of something relative to a standard.

measurement—a value of a variable, the value determined by manual and/or automatic observation.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

message—a communication.

method—a process, procedure, and/or collection of related activities for accomplishing something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

occur—to take place.

object block—computer software adapted to perform one or more predetermined tasks.

obtain—to receive, get, take possession of, procure, acquire, calculate, determine, and/or compute.

one—a single unit.

only—entirely without an inclusion of anything else.

output—(n) something produced and/or generated; data produced by an information device executing machine-readable instructions; and/or the energy, power, work, signal, and/or information produced by a system. (v) to provide, produce, manufacture, and/or generate.

plurality—the state of being plural and/or more than one.

predetermined—established in advance.

predetermined threshold—a limit established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, ignitors, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

promptly—without appreciable and/or substantial delay.

provide—to furnish, supply, give, convey, send, and/or make available.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

record—to store information in a retrievable form.

regarding—pertaining to.

related—connected to and/or associated with.

render—to display, annunciate, speak, print, and/or otherwise make perceptible to a human, for example as data, commands, text, graphics, audio, video, animation, and/or hyperlinks, etc., such as via any visual, audio, and/or haptic means, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

reset—to establish a value subsequent to a previous establishment of the value and/or to return a value of a variable to a prior value of that variable.

respond—to reply and/or answer.

responsive—reacting to an influence and/or impetus.

rule—a conditional expression, typically in "If X, then Y" format, that defines one or more consequents (e.g., Y) based on one or more antecedents (e.g., X).

said—when used in a system or device claim, an article indicating a subsequent claim term that has been previously introduced.

scan cycle—a time interval that is less than approximately one second in duration, during which a predetermined set of actions are performed.

second—an element that immediately follows an initial element of a series.

selected—a chosen item.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, strain gages, photo sensors, thermocouples, level indicating devices, speed sensors, accelerometers, electrical voltage indicators, electrical current indicators, on/off indicators, and/or flowmeters, etc.

set—to establish a value.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

single—existing alone or consisting of one entity.

soft deadline—the general case where completing the activity by the deadline results in the system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to a system (or sub-system) that takes a best efforts approach and seeks to minimize latency from event to response as much as possible while keeping throughput up with external events overall. Such systems will not necessarily suffer a critical failure if time constraints are violated. A classic example is an airline reservations system, which has a target "maximum" response time. All is well if the response is much faster than this "maximum." Further, exceeding the "maximum" is undesirable, but such extended delays can be tolerated up to a point if they do not occur too frequently. As another example, live audio-video systems are usually soft real-time; violation of time constraints can result in degraded quality, but the system typically can continue to operate. Yet another example is a network server, which is a system for which fast response is desired but for which there is typically no deadline. If the network server is highly loaded, its response time may slow with no actual failure in service.

status—a state and/or condition and/or information related thereto.

substantially—to a considerable, large, and/or great, but not necessarily whole and/or entire, extent and/or degree.

system—a collection of mechanisms, devices, data, and/or instructions, the collection designed to perform one or more specific functions.

transmit—to provide, furnish, supply, send as a signal, and/or to convey (e.g., force, energy, and/or information) from one place and/or thing to another.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

via—by way of and/or utilizing.

wherein—in regard to which; and; and/or in addition to.

without—not accompanied by.

written—placed in a memory device (e.g. data).

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, performed by multiple entities, and/or performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, abstract, drawing figure, etc.) of this application, other than the claims themselves, is to be regarded as illustrative in nature, and not as restrictive.

What is claimed is:

1. A method comprising:
providing a signal indicative of a set single bit flag, wherein:
said flag is set for a first scan cycle in response to a detection of a fault in an Input/Output (I/O) device of a programmable logic controller (PLC) system or an I/O interface of said PLC system, and said flag is promptly reset at a conclusion of said first scan cycle; and
said flag is set for a second scan cycle in response to a determination that said fault has been cleared, and said flag is promptly reset at a conclusion of said second scan cycle.

2. The method of claim 1, further comprising:
detecting said fault.

3. The method of claim 1, further comprising:
determining that said fault has been cleared.

4. The method of claim 1, further comprising:
analyzing a message indicative of said fault; and
recording information related to said fault in an entry in a log.

5. The method of claim 1, further comprising:
automatically receiving said signal indicative of said flag at a user control program of a PLC of said PLC system, said user control program written in an International Electrotechnical Commission (IEC) standard 1131-3 compliant language.

6. The method of claim 1, further comprising:
automatically analyzing said signal indicative of said flag via a user control program of a PLC of said PLC system, said user control program written in an International Electrotechnical Commission (IEC) standard 1131-3 compliant language.

7. The method of claim 1, further comprising:
automatically responding, via a rule based action, to said signal indicative of said flag by a user control program of a PLC of said PLC system, said user control program written in an International Electrotechnical Commission (IEC) standard 1131-3 compliant language.

8. The method of claim 1, further comprising:
automatically determining a history of status changes of said flag via a user control program of a PLC of said PLC system, said user control program written in an International Electrotechnical Commission (IEC) standard 1131-3 compliant language.

9. The method of claim 1, further comprising:
resetting said flag for only said second scan cycle responsive to said determination that said fault has been cleared.

10. The method of claim 1, further comprising:
automatically creating an event, via PLC firmware, at a PLC of said PLC system.

11. The method of claim 1, further comprising:
responsive to said flag, automatically causing a system interrupt to be executed, via PLC firmware, at a PLC of said PLC system.

12. The method of claim 1, further comprising:
responsive to said flag, automatically causing an object block to be executed, via PLC firmware, at a PLC of said PLC system.

13. The method of claim 1, further comprising:
responsive to said flag, automatically creating a diagnostic error, via PLC firmware, at a PLC of said PLC system.

14. The method of claim 1, wherein said fault is detected via a cyclical redundancy check by said I/O device.

15. The method of claim 1, wherein said fault is detected via a cyclical redundancy check in a message transmitted from said I/O device.

16. The method of claim 1, wherein said fault is detected via a cyclical redundancy check in a message transmitted to said I/O interface.

17. The method of claim 1, wherein said fault is detected via a cyclical redundancy check by said I/O device of I/O device firmware.

18. A machine-readable medium comprising machine instructions for activities comprising:
providing a signal indicative of a set single bit flag, wherein:
said flag is set for a first scan cycle in response to a detection of a fault in an Input/Output (I/O) device of a programmable logic controller (PLC) system or an I/O interface of said PLC system, and said flag is promptly reset at a conclusion of said first scan cycle; and
said flag is set for a second scan cycle in response to a determination that said fault has been cleared, and said flag is promptly reset at a conclusion of said second scan cycle.

19. A system comprising:
a circuit adapted to provide a signal indicative of a set single bit flag, wherein: said flag is set for a first scan cycle in response to a detection of a fault in an Input/Output (I/O) device of a programmable logic controller (PLC) system or an I/O interface of said PLC system, and said flag is promptly reset at a conclusion of said first scan cycle; and
said flag is set for a second scan cycle in response to a determination that said fault has been cleared, and said flag is promptly reset at a conclusion of said second scan cycle.

* * * * *